(12) United States Patent
Hiramatsu et al.

(10) Patent No.: US 10,850,740 B2
(45) Date of Patent: Dec. 1, 2020

(54) DRIVING ASSISTANCE METHOD AND DRIVING ASSISTANCE DEVICE

(71) Applicant: Nissan Motor Co., Ltd., Yokohama (JP)

(72) Inventors: Machiko Hiramatsu, Kanagawa (JP); Takashi Sunda, Kanagawa (JP); Hwaseon Jang, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/631,713

(22) PCT Filed: Jul. 27, 2017

(86) PCT No.: PCT/JP2017/027294
§ 371 (c)(1),
(2) Date: Jan. 16, 2020

(87) PCT Pub. No.: WO2019/021429
PCT Pub. Date: Jan. 31, 2019

(65) Prior Publication Data
US 2020/0164888 A1 May 28, 2020

(51) Int. Cl.
*B60W 40/09* (2012.01)
*B60W 60/00* (2020.01)
*B60W 40/02* (2006.01)
*G05D 1/00* (2006.01)

(52) U.S. Cl.
CPC ............ *B60W 40/09* (2013.01); *B60W 40/02* (2013.01); *B60W 60/001* (2020.02); *G05D 1/0088* (2013.01); *B60W 2554/80* (2020.02); *B60W 2556/45* (2020.02); *G05D 2201/0213* (2013.01)

(58) Field of Classification Search
CPC .... B60W 40/09; B60W 60/001; B60W 40/02; G05D 1/0088
See application file for complete search history.

(56) References Cited

U.S. PATENT DOCUMENTS

| 5,521,823 | A | 5/1996 | Akita et al. |
| 10,431,089 | B1 * | 10/2019 | Nguyen ................. B60Q 9/00 |
| 2003/0093210 | A1 | 5/2003 | Kondo et al. |

(Continued)

FOREIGN PATENT DOCUMENTS

| JP | H05-058200 A | 3/1993 |
| JP | 2002-137649 A | 5/2002 |

(Continued)

*Primary Examiner* — Hussein Elchanti
(74) *Attorney, Agent, or Firm* — Young Basile Hanlon & MacFarlane, P.C.

(57) ABSTRACT

A driving assistance method is for an automated driving vehicle that is capable of switching between manual driving by a driver and automated driving, learns a driving characteristic of the driver during the manual driving, and reflects a learning result to a driving characteristic under control of the automated driving, and the driving assistance method includes: detecting a driving characteristic of an area in which the automated driving vehicle is traveling; and adjusting the learning result according to the detected driving characteristic of the area and executing the control of the automated driving based on the adjusted learning result.

11 Claims, 10 Drawing Sheets

(56) References Cited

U.S. PATENT DOCUMENTS

| | | | |
|---|---|---|---|
| 2007/0179735 A1* | 8/2007 | Fiedler | B60T 8/885 |
| | | | 702/150 |
| 2013/0144516 A1 | 6/2013 | Sato | |
| 2014/0005871 A1* | 1/2014 | Saito | B60L 50/13 |
| | | | 701/22 |
| 2015/0309512 A1 | 10/2015 | Cudak et al. | |
| 2016/0280236 A1* | 9/2016 | Otsuka | B60W 50/082 |
| 2017/0166203 A1* | 6/2017 | Sugai | B60W 10/184 |
| 2017/0197618 A1 | 7/2017 | Ali et al. | |
| 2017/0313304 A1* | 11/2017 | Shiraishi | B60W 10/20 |
| 2017/0369052 A1* | 12/2017 | Nagy | B60W 40/09 |
| 2018/0253963 A1* | 9/2018 | Coelho de Azevedo | |
| | | | G08G 1/012 |
| 2019/0347879 A1* | 11/2019 | Motomura | B60R 21/00 |

FOREIGN PATENT DOCUMENTS

| | | |
|---|---|---|
| JP | 2003-211999 A | 7/2003 |
| JP | 2005-075303 A | 3/2005 |
| JP | 2009-237937 A | 10/2009 |
| JP | 2010-112798 A | 5/2010 |
| JP | 2012-043094 A | 3/2012 |
| JP | 2012-164289 A | 8/2012 |
| JP | 2013-178827 A | 9/2013 |
| JP | 2015-89801 A | 5/2015 |
| JP | 2016-216029 A | 12/2016 |

* cited by examiner

FIG. 5

| INTER-VEHICLE DISTANCE D | VEHICLE SPEED V | x1 | x2 | x3 | x4 | x5 | x6 | y1 |
|---|---|---|---|---|---|---|---|---|
| 18.44713 | 10.2 | 0 | 0 | 0 | 1 | 0 | 0 | 1 |
| 15.85535 | 8.972222 | 0 | 0 | 0 | 1 | 0 | 0 | 1 |
| 13.88197 | 7.827778 | 0 | 0 | 0 | 1 | 0 | 0 | 1 |
| 9.694338 | 5.547222 | 0 | 0 | 0 | 1 | 0 | 0 | 1 |
| 7.775191 | 4.391667 | 0 | 0 | 0 | 1 | 0 | 0 | 1 |
| 2.965726 | 0 | 0 | 0 | 0 | 0 | 0 | 1 | 0 |
| 11.97936 | 6.127778 | 0 | 0 | 0 | 0 | 0 | 1 | 0 |
| 10.5132 | 5.586111 | 0 | 0 | 0 | 0 | 0 | 1 | 0 |
| 9.87951 | 4.997222 | 0 | 0 | 0 | 0 | 0 | 1 | 0 |
| 9.232326 | 4.447222 | 0 | 0 | 0 | 1 | 0 | 0 | 1 |
| 15.77443 | 8.875 | 1 | 0 | 1 | 1 | 0 | 0 | 1 |
| 13.98813 | 7.947222 | 1 | 0 | 1 | 1 | 0 | 0 | 1 |
| 12.41838 | 6.866667 | 1 | 0 | 1 | 1 | 0 | 0 | 1 |
| 10.59575 | 5.741667 | 1 | 0 | 1 | 1 | 0 | 0 | 1 |
| 9.087317 | 4.672222 | 1 | 0 | 1 | 1 | 0 | 0 | 1 |

FIG. 6

| | COEFFICIENT | ENVIRONMENTAL FACTOR | TERM | DESCRIPTION |
|---|---|---|---|---|
| TIME-HEADWAY (sec) | a0 | REFERENCE VALUE FOR EACH TRIP | | AVERAGE VALUE OF TIME-HEADWAY IN TRIP WHEN x1 TO x6 = 0 |
| | a1 | NUMBER OF LANES | x1 | 1: TWO OR MORE LANES ON ONE SIDE, 0: ONE LANE ON ONE SIDE OR NARROWER |
| | a2 | SLOPE | x2 | 1: UPHILL, 0: OTHER |
| | a3 | TRAFFIC LIGHT | x3 | 1: RED LIGHT, 0: OTHER |
| | a4 | DISTANCE TO INTERSECTION | x4 | 1: LESS THAN J (m) FROM STOP LINE, 0: J (m) OR MORE |
| | a5 | CONGESTION DEGREE | x5 | 1: N OR MORE VEHICLES WITHIN L (m) AHEAD, 0: N-1 OR LESS |
| | a6 | DIRECTION INDICATOR | x6 | 1: DIRECTION INDICATOR IS ON, 0: OFF |
| DISTANCE BETWEEN STOPPED VEHICLES (m) | b0 | REFERENCE VALUE FOR EACH PERSON | | DISTANCE BETWEEN STOPPED VEHICLES WHEN y1 = 0 |
| | b1 | DISTANCE TO STOP LINE | y1 | 1: K (m) OR MORE FROM STOP LINE, 0: LESS THAN K (m) |

FIG. 7

| BRAKING DISTANCE Db | SPEED AT START OF DECELERATION Vb | x1 | x2 | x3 | x4 | x5 | x6 |
|---|---|---|---|---|---|---|---|
| 18.44713 | 10.2 | 0 | 0 | 0 | 1 | 0 | 0 |
| 15.85535 | 8.972222 | 0 | 0 | 0 | 1 | 0 | 0 |
| 13.88197 | 7.827778 | 0 | 0 | 0 | 1 | 0 | 0 |
| 9.694338 | 5.547222 | 0 | 0 | 0 | 1 | 0 | 0 |
| 7.775191 | 4.391667 | 0 | 0 | 0 | 1 | 0 | 0 |
| 2.965726 | 0 | 0 | 0 | 0 | 1 | 0 | 1 |
| 11.97936 | 6.127778 | 0 | 0 | 0 | 0 | 0 | 1 |
| 10.5132 | 5.586111 | 0 | 0 | 0 | 0 | 0 | 1 |
| 9.87951 | 4.997222 | 0 | 0 | 0 | 0 | 0 | 1 |
| 9.232326 | 4.447222 | 1 | 0 | 1 | 1 | 0 | 0 |
| 15.77443 | 8.875 | 1 | 0 | 1 | 1 | 0 | 0 |
| 13.98813 | 7.947222 | 1 | 0 | 1 | 1 | 0 | 0 |
| 12.41838 | 6.866667 | 1 | 0 | 1 | 1 | 0 | 0 |
| 10.59575 | 5.741667 | 1 | 0 | 1 | 1 | 0 | 0 |
| 9.087317 | 4.672222 | 1 | 0 | 1 | 1 | 0 | 0 |

FIG. 8

| | COEFFICIENT | ENVIRONMENTAL FACTOR | TERM | DESCRIPTION |
|---|---|---|---|---|
| DECELERATION $(m/s^2)$ | c0 | REFERENCE VALUE FOR EACH PERSON | | AVERAGE VALUE FOR EACH PERSON WHEN x1 TO x6 = 0 |
| | c1 | CURVED ROAD | x1 | 1: ROAD CURVATURE IS EQUAL TO OR GREATER THAN PREDETERMINED VALUE, 0: ROAD CURVATURE IS SMALLER THAN PREDETERMINED VALUE |
| | c2 | SLOPE | x2 | 1: DOWNHILL, 0: OTHER |
| | c3 | TRAFFIC LIGHT | x3 | 1: RED LIGHT, 0: OTHER |
| | c4 | NIGHT-TIME | x4 | 1: HEADLIGHTS ARE TURNED ON, 0: HEADLIGHTS ARE NOT TURNED ON |
| | c5 | WEATHER | x5 | 1: BAD WEATHER, 0: OTHER |
| | c6 | RIGHT OR LEFT TURN | x6 | 1: DIRECTION INDICATOR IS ON, 0: OFF |
| TTI (S) | d | DEGREE OF DEPENDENCY ON TTI | | VALUE BECOMES CLOSER TO 1 AS DEGREE OF DEPENDENCY ON TTI IS HIGHER |

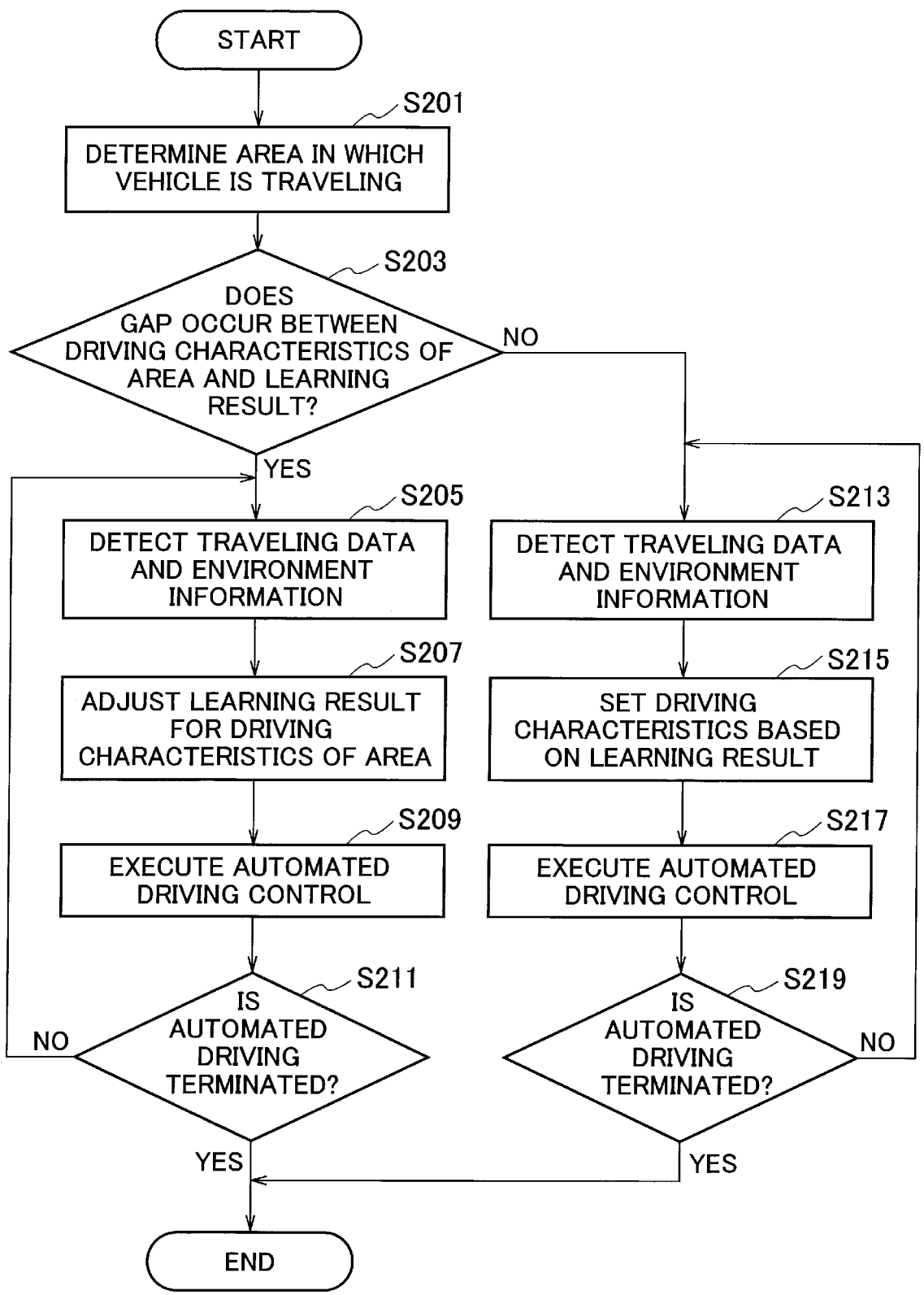

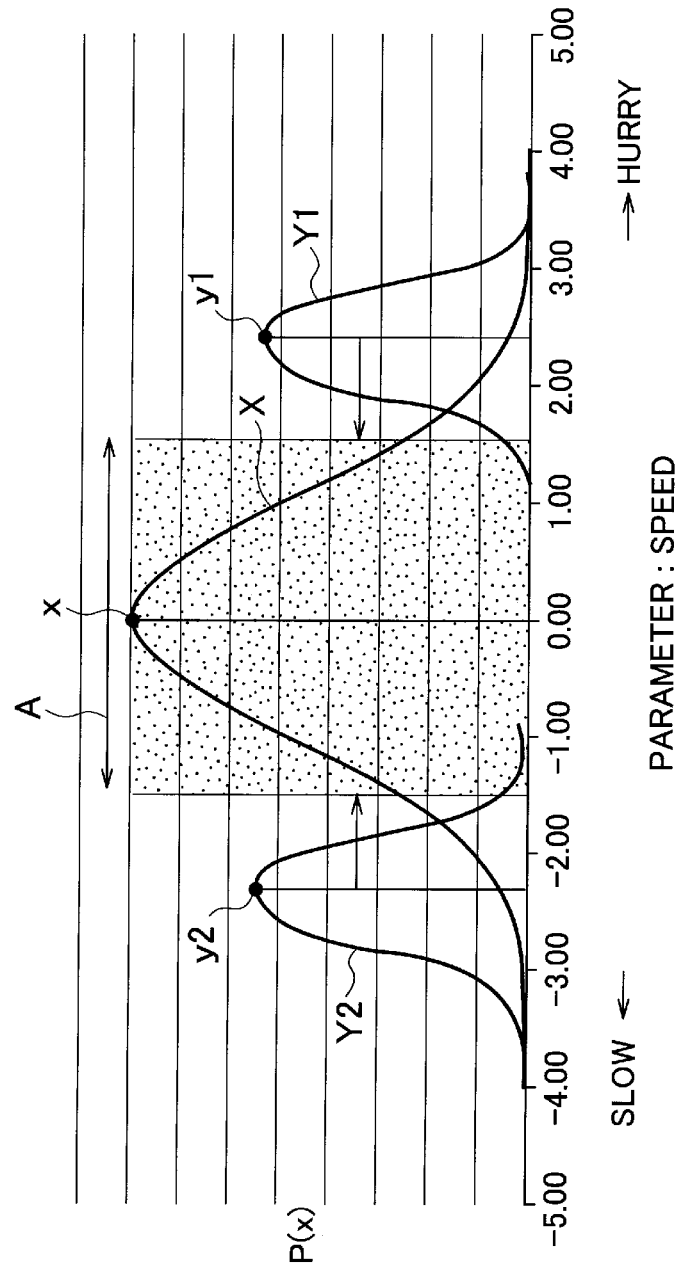

DRIVING ASSISTANCE METHOD AND DRIVING ASSISTANCE DEVICE

TECHNICAL FIELD

The present invention relates to a method and a device of driving assistance for an automated driving vehicle that is capable of switching between manual driving by a driver and automated driving, learns driving characteristics of the driver during the manual driving, and reflects the learning result to driving characteristics under control of the automated driving.

BACKGROUND

In the related art, Japanese Patent Application Publication No. 2015-89801 has been disclosed as a driving control device that learns driving operations by the driver during the manual driving so as to suppress the discomfort feeling of the driver during the automated driving. The driving control device disclosed in Japanese Patent Application Publication No. 2015-89801 sets environment items such as the number of lanes and weather. Then, during the manual driving, the driving control device identifies a driving environment based on the environment items and learns driving operations of the driver in association with the driving environment.

SUMMARY

However, the above-described conventional driving control device directly applies the result of learning from the driver to the automated driving control, and does not take driving characteristics of the traveling area into consideration. In this case, if the driving characteristics of the driver are different from the driving characteristics of the area in which the automated driving is being used, or if the area in which the driving characteristics are learned is different from the area in which the automated driving is being used, the automated driving vehicle behaves differently from surrounding vehicles. This poses a problem that an occupant of the automated driving vehicle feels insecure.

The present invention is proposed in light of the above-described circumstances, and an object of the present invention is to provide a driving assistance method and a driving assistance device that can prevent an occupant from feeling insecure due to a different behavior of an automated driving vehicle from those of surrounding vehicles.

In order to solve the above-described problem, a driving assistance method and a driving assistance device according to an aspect of the present invention detects driving characteristics of the area in which an automated driving vehicle is traveling, adjusts the learning result according to the detected driving characteristics of the area, and executes the automated driving control based on the adjusted learning result.

According to the present invention, it is possible to prevent the insecure feeling of an occupant by suppressing the different behavior of an automated driving vehicle from surrounding vehicles.

BRIEF DESCRIPTION OF THE DRAWINGS

FIG. 5 is a diagram showing an example of data inputted by the driving characteristic learning processing according to the embodiment of the present invention;

FIG. 6 is a diagram for describing coefficients of multiple regression analysis executed in the driving characteristic learning processing according to the embodiment of the present invention;

FIG. 7 is a diagram showing an example of data inputted by the driving characteristic learning processing according to the embodiment of the present invention;

FIG. 8 is a diagram for describing coefficients of multiple regression analysis executed in the driving characteristic learning processing according to the embodiment of the present invention;

FIG. 9 is a flowchart showing a processing procedure of automated driving control processing by the driving assistance device according to the embodiment of the present invention; and FIG. 10 is a diagram for describing processing of adjusting learning result of the driving characteristic learning processing according to the embodiment of the present invention for the driving characteristics of the area.

DETAILED DESCRIPTION

An embodiment to which the present invention is applied is described below with reference to the drawings.

[Configuration of Driving Assistance System]

Figure 1:
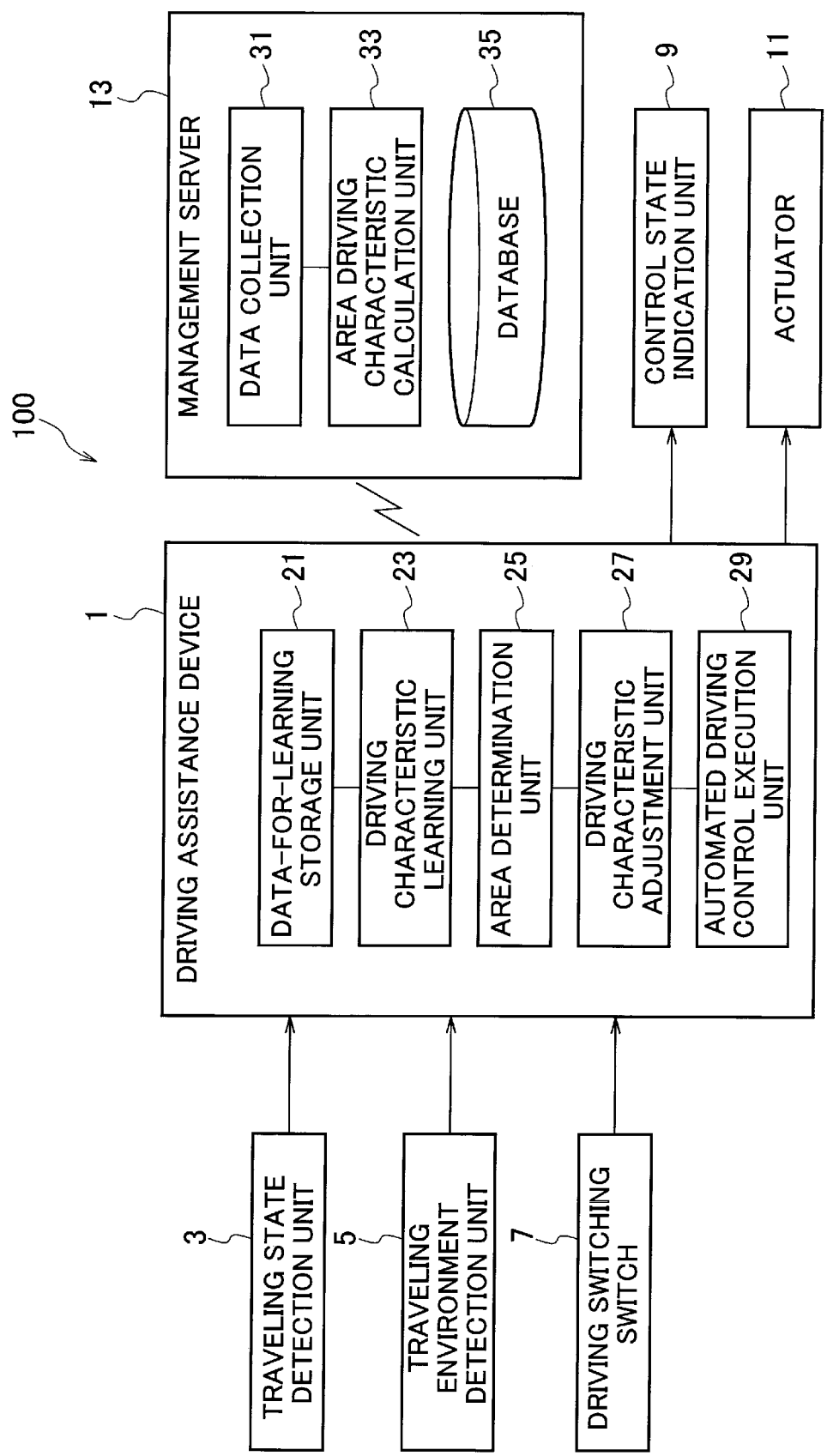
FIG. 1 is a block diagram showing a configuration of a driving assistance system that includes a driving assistance device according to an embodiment of the present invention.

FIG. 1 is a block diagram showing a configuration of a driving assistance system that includes a driving assistance device according to this embodiment. As shown in FIG. 1, a driving assistance system 100 according to this embodiment is mounted in an automated driving vehicle and includes a driving assistance device 1, a traveling state detection unit 3, a traveling environment detection unit 5, a driving switching switch 7, and a control state indication unit 9. Additionally, the driving assistance system 100 is connected to an actuator 11 mounted in the vehicle and is connected to a management server 13 through a communication network.

The driving assistance device 1 is a controller that is capable of switching between the manual driving by the driver and the automated driving control and that executes processing of learning driving characteristics of the driver during the manual driving and reflecting the learning result to driving characteristics under the automated driving control. Specifically, the driving assistance device 1 detects driving characteristics of the area in which the automated driving vehicle is traveling, adjusts the learning result according to the detected driving characteristics of the area, and executes the automated driving control based on the adjusted learning result. The driving assistance device 1 herein includes a data-for-learning storage unit 21, a driving characteristic learning unit 23, an area determination unit 25, a driving characteristic adjustment unit 27, and an automated driving control execution unit 29. In this embodiment, the case where the driving assistance device 1 is mounted in an automated driving vehicle is described; however, the driving assistance device 1 may be disposed in an external server with a communication device disposed in the vehicle.

Note that, the manual driving in this embodiment is driving that allows a vehicle to travel with operations by the driver. On the other hand, the automated driving in this embodiment is that a vehicle travels with something other than the driver intervening into a steering, an accelerator, and a brake. The automated driving includes not only the automated driving control that enables traveling without operations by the driver but also the vehicle speed maintaining control, the lane departure prevention control, and the preceding vehicle following control. Additionally, the automated driving also includes the control for accepting a driving intervention of an occupant (override).

The driving in the case where a function of assisting the driving operation is active by the vehicle dynamics control (VDC) or the electric power steering (EPS) may either be set as the manual driving or not. If the driving in the case where the function of assisting the driving operation is active by the VDC or the EPS is set as the manual driving, the amounts of operations by the driver and control instruction values based on the amounts of operations by the driver may be used as the driving characteristics of the driver. Conversely, the amounts of operations and control instruction values by the driving operation assistance may be used as the driving characteristics of the driver. Also, the amounts of operations and control instruction values by both the driver and the driving operation assistance, or the driving characteristics of the vehicle may be learned as the driving characteristics of the driver. On the other hand, if the driving in the case where the function of the driving operation assistance is active is not set as the manual driving, it is possible to separately learn the case where the function of the driving operation assistance is inactive. In this case, a scene where the stable learning is possible is selected, which makes it possible to learn the driving characteristics of the driver accurately.

The traveling state detection unit 3 detects traveling data indicating the traveling state of the vehicle such as a vehicle speed, a steering angle, an acceleration, an inter-vehicle distance to a preceding vehicle, a speed relative to a preceding vehicle, a current location, a lighting state of headlights, a display state of a direction indicator, an operation state of wipers, and so on. For example, the traveling state detection unit 3 is an in-vehicle network such as a controller area network (CAN), a navigation device, a laser radar, a camera, or the like.

The traveling environment detection unit 5 detects environment information indicating the environment in which the vehicle is traveling such as the number of lanes of the road on which the vehicle is traveling, a speed limit, a slope of the road, a display state of a traffic light ahead of the vehicle, a distance to an intersection ahead of the vehicle, the number of vehicles traveling ahead of the vehicle, a planned course at the intersection ahead of the vehicle, and so on. Additionally, a curvature of the road, the presence or absence of a stop restriction, and the like may be detected as the environment information. For example, the traveling environment detection unit 5 is a camera, a laser radar, or a navigation device mounted in the vehicle. The planned course at the intersection ahead of the vehicle is obtained from the navigation device or a display state of the direction indicator, for example. Additionally, an illuminance, a temperature, and a weather state around the vehicle are obtained from an illuminance sensor, an ambient temperature sensor, and a wiper switch, respectively. Note that, an illuminance may also be obtained from a switch of the headlights.

The driving switching switch 7 is a switch that is mounted in the vehicle and operated by the occupant of the vehicle to perform switching between the automated driving control and the manual driving. For example, the driving switching switch 7 is arranged on a steering of the vehicle.

The control state indication unit 9 displays whether the current control state is the manual driving or the automated driving control on a meter display unit, a display screen of the navigation device, a head-up display, or the like. Additionally, the control state indication unit 9 also outputs notification sounds to tell the beginning and ending of the automated driving control to indicate whether the learning of the driving characteristics ends.

The actuator 11 receives an execution instruction from the driving assistance device 1 and drives parts such as the accelerator, the brake, the steering, and the like of the vehicle.

The management server 13 is a probe server disposed in a data center of a probe car system and collects probe data from many vehicles to calculate and accumulate the driving characteristics of each area.

The management server 13 includes a data collection unit 31, an area driving characteristic calculation unit 33, and a database 35. The data collection unit 31 collects the probe data from many vehicles through a communication network. In this process, since the data collection unit 31 detects the area of the data to be collected, it is possible to categorize the data according to area while collecting.

Figure 2:
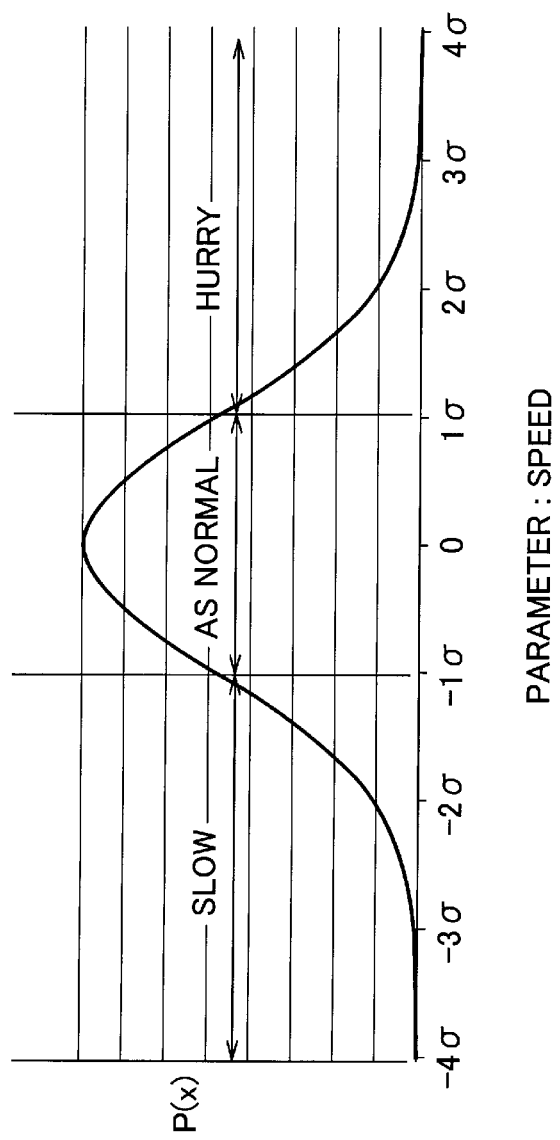
FIG. 2 is a diagram showing an example of driving characteristics of an area calculated by the driving assistance system according to the embodiment of the present invention.

The area driving characteristic calculation unit 33 uses the data collected by the data collection unit 31 to calculate the driving characteristics of each area. Based on the collected data, the area driving characteristic calculation unit 33 calculates statistics value such as averages and standard deviations of parameters such as an inter-vehicle distance, a timing of braking (a braking distance), a speed, an acceleration, a gap time, and so on for each area. The driving characteristics of the area are indicated by a probability distribution as shown in FIG. 2 and are calculated for each parameter and each area. For example, the driving characteristics of FIG. 2 are driving characteristics of the case where the parameter is a speed, and in this case, the range of $\pm 1\sigma$ is the normal range, the range of $+1\sigma$ or greater is the range where the driver tends to drive in hurry, and the range of $-1\sigma$ or smaller is the range where the driver tends to drive slowly. The areas may be divided by administrative unit. For example, the unit is a country, a state, a prefecture, a city, a town, a village, or the like. Additionally, areas having similar driving characteristics may be defined as one area. For example, as a result of the calculation of the driving characteristics, areas having a tendency of impatient driving may be defined as one area.

The database 35 accumulates the collected probe data and also stores the driving characteristics of the area calculated by the area driving characteristic calculation unit 33.

Next, the units constituting the driving assistance device 1 are described. The data-for-learning storage unit 21 obtains the traveling data on the traveling state of the vehicle and the environment information on the traveling environment around the vehicle from the traveling state detection unit 3 and the traveling environment detection unit 5 and stores the data required for the driving characteristic learning processing. Specifically, the data-for-learning storage unit 21 stores the traveling data used for the learning of an inter-vehicle distance, a braking distance, and so on during the manual driving. In this process, the data-for-learning storage unit 21 stores the traveling data in association with the traveling state and the traveling environment of the vehicle. In addition to a speed and an inter-vehicle distance, the traveling data to be stored includes the data such as a current location, a speed relative to a preceding vehicle, a steering angle, a deceleration, a duration time of following after a preceding vehicle, a speed at the start of deceleration, a braking distance, amounts of operations of a brake pedal and an acceleration pedal, a distance to a stop line, and so on. Additionally, the data-for-learning storage unit 21 stores the environment information as well. The environment information includes the number of lanes of the road on which the vehicle is traveling, a speed limit, a slope of the road or a display state of a traffic light, a distance from the vehicle to an intersection, the number of vehicles ahead of the vehicle, a display state of the direction indicator, a curvature of the road, the presence or absence of a stop restriction, weather, a temperature, or an illuminance around the vehicle, and so on.

The driving characteristic learning unit 23 reads the traveling data stored in the data-for-learning storage unit 21 and learns the driving characteristics of the driver during the manual driving with consideration for the degree of effects from the traveling state and the traveling environment. In addition to an inter-vehicle distance to a preceding vehicle and a braking timing (a braking distance), the driving characteristics to be learned include a speed, an acceleration, a gap time, and so on. The gap time is a difference between a time at which the host vehicle starts to turn right at an intersection and a time at which an oncoming vehicle reaches the intersection, or is a difference between a time at which the host vehicle enters an intersection having a stop restriction and a time at which a crossing vehicle enters the intersection. The thus-calculated learning results are stored in the driving characteristic learning unit 23 whenever necessary.

Figure 3:
FIG. 3 is a diagram for describing how to divide areas by the driving assistance system according to the embodiment of the present invention.

The area determination unit 25 obtains the current location of the vehicle from the data-for-learning storage unit 21 and determines the area in which the vehicle is currently traveling based on the current location of the vehicle. The area to be determined may be divided by administrative unit. For example, the unit is a country, a state, a prefecture, a city, a town, a village, or the like. Particularly, the speed limit may be changed when crossing the border of countries. In such a case, because the driving characteristics are likely to be changed depending on the countries, it is effective for an area including adjacent multiple countries to define the countries as one area. Areas having similar driving characteristics may be defined as one area. For example, in Japan, the Kanto region, the Nagoya region, the Kansai region, and the like may be each defined as one area as shown in FIG. 3. In this way of dividing, as a result of the learning of the driving characteristics, areas having no distribution difference of the driving behavior are defined as one area.

The driving characteristic adjustment unit 27 detects the driving characteristics of the area that is determined by the area determination unit 25 as the area in which the automated driving vehicle is currently traveling, and adjusts the learning result of the driving characteristics learned by the driving characteristic learning unit 23 according to the detected driving characteristics of the area. For example, when a predetermined gap occurs between the driving characteristics of the area and the learning result, the learning result of the driving characteristics are adjusted to be closer to the driving characteristics of the area. The driving characteristics of the area may be obtained from the management server 13, which is an external server, through a communication device or may be stored in the driving characteristic adjustment unit 27 in advance. The calculation of the driving characteristics of the area may be performed in the driving assistance device 1 instead of using the management server 13.

The adjusting of the learning result is not limited to direct adjusting of the driving characteristics (for example, changing of a control instruction value to change the average vehicle speed from 30 km/h to 40 km/h), and the driving characteristics may be adjusted indirectly by processing the traveling data (the traveling data is processed by, for example, selecting data for generating the driving characteristics or adjusting the data range to be used to generate the control instruction value for changing the average vehicle speed from 30 km/h to 40 km/h).

When entering an automated driving section or when the driver selects the automated driving control through the driving switching switch 7, the automated driving control execution unit 29 executes the automated driving control. In this process, the automated driving control execution unit 29 executes the automated driving control based on the learning result adjusted by the driving characteristic adjustment unit 27.

The driving assistance device 1 includes a general-purpose electronic circuit including a microcomputer, a microprocessor, and a CPU and a peripheral device such as a memory. With a specific program executed, the driving assistance device 1 is operated as the above-described data-for-learning storage unit 21, driving characteristic learning unit 23, area determination unit 25, driving characteristic adjustment unit 27, and automated driving control execution unit 29. The functions of the driving assistance device 1 can be implemented by one or more processing circuits. For example, the processing circuits include a programmed processing device such as a processing device including an electric circuit, and the processing circuits also include devices such as an application specific integrated circuit (ASIC) adapted to execute the functions described in the embodiment and a conventional circuit component.

[Procedure of Driving Characteristic Learning Processing]

Next, a procedure of the driving characteristic learning processing by the driving assistance device 1 according to this embodiment is described with reference to the flowchart in FIG. 4. The driving characteristic learning processing shown in FIG. 4 is started when the ignition of the vehicle is turned on.

Figure 4:
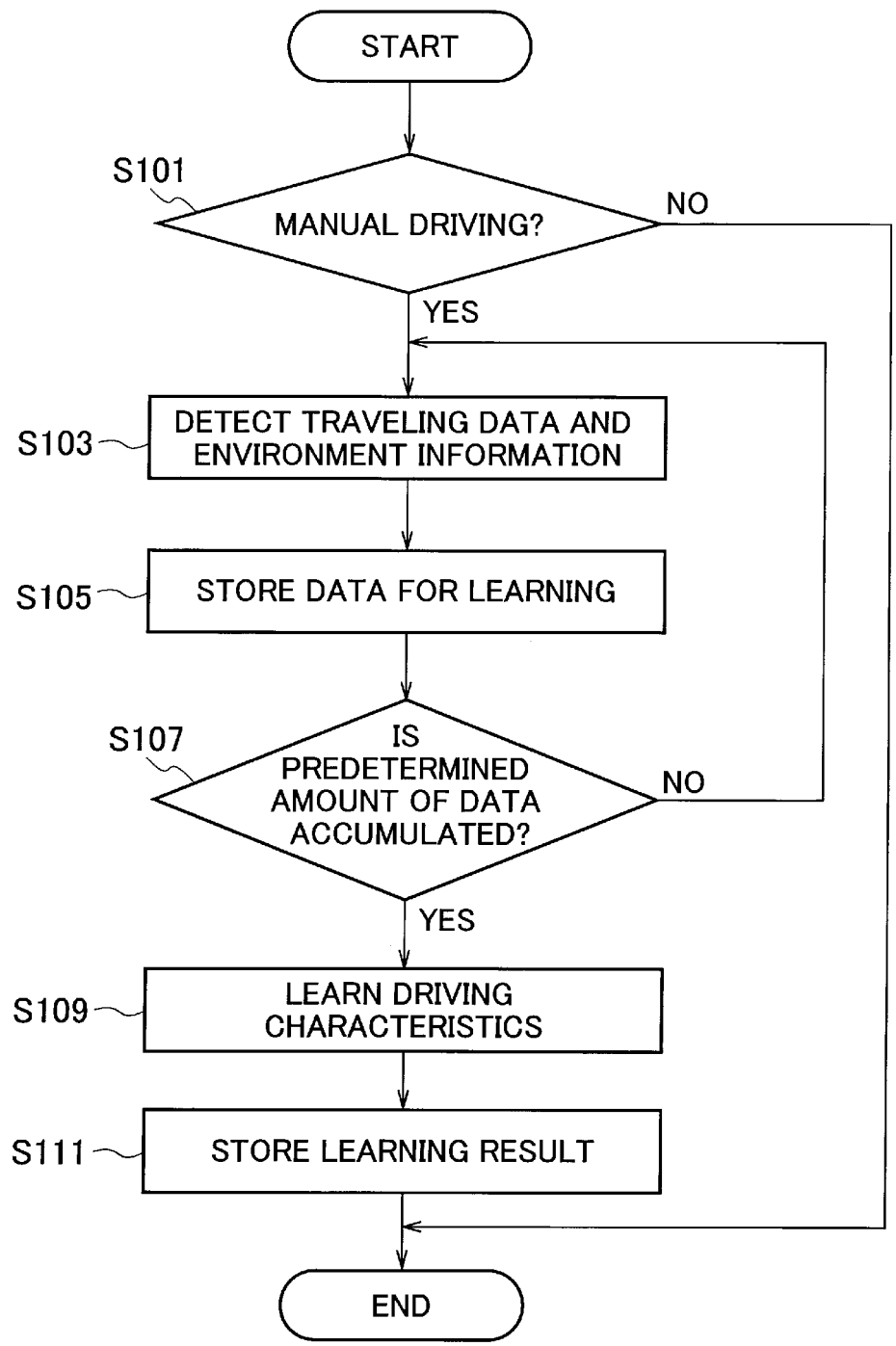
FIG. 4 is a flowchart showing a processing procedure of driving characteristic learning processing by the driving assistance device according to the embodiment of the present invention.

As shown in FIG. 4, first, in step S101, the data-for-learning storage unit 21 determines whether the vehicle is in the manual driving based on the state of the driving switching switch 7. When the vehicle is in the manual driving, the process proceeds to step S103, and when the vehicle is in the automated driving, the driving characteristic learning processing is terminated and the automated driving control is executed.

In step S103, the data-for-learning storage unit 21 detects the traveling data on the traveling state of the vehicle and the environment information on the traveling environment around the vehicle from the traveling state detection unit 3 and the traveling environment detection unit 5. The traveling data to be detected includes a vehicle speed, a steering angle, an acceleration, a deceleration, an inter-vehicle distance to a preceding vehicle, a speed relative to a preceding vehicle, a current location, a planned course at the intersection ahead of the vehicle, amounts of operations of a brake pedal and an acceleration pedal, a duration time of following after a preceding vehicle, an operation state of wipers, and so on.

For the environment information, the number of lanes of the road on which the vehicle is traveling, a speed limit, a slope of the road or a display state of a traffic light, a distance from a vehicle to an intersection, the number of vehicles ahead of the vehicle, a display state of a direction indicator of the vehicle, weather, a temperature, or an illuminance around the vehicle, and so on are detected.

In step S105, the data-for-learning storage unit 21 stores the traveling data and the environment information detected in step S103 as the data for learning.

An example of the data for learning stored in the data-for-learning storage unit 21 is shown in FIG. 5. As shown in FIG. 5, pieces of data of an inter-vehicle distance D, a vehicle speed V, x1 to x6, and y1 are recorded in the data for learning. x1 to x6 and y1 are data that are set based on the environment information, and a value of 0 or 1 is set according to a setting method shown in FIG. 6. For example, in the case where the data of the inter-vehicle distance D and the vehicle speed V shown in FIG. 5 are obtained, for x1, 1 is set when the vehicle is traveling on a road with two or more lanes on one side, and 0 is set when the vehicle is traveling on a road with one lane on one side or narrower.

For x2, 1 is set when the vehicle is traveling uphill, and 0 is set in other cases (a flat road or downhill), and for x3, 1 is set when a traffic light ahead of the vehicle is a red light, and 0 is set in other cases (a green light or no traffic light). Note that, the red light may include a yellow light. For x4, 1 is set when a distance from the vehicle to an intersection is shorter than a predetermined value J [m], and 0 is set when the distance is equal to or longer than the predetermined value J [m], and for x5, 1 is set when the number of vehicles within L [m] ahead of the vehicle is equal to or greater than a predetermined value N, and 0 is set when the number of vehicles is equal to or smaller than the predetermined value N−1. For x6, 1 is set when the direction indicator used for turning the vehicle right or left is ON, and 0 is set when the direction indicator is OFF. Additionally, for y1, 1 is set when a distance from the stopped vehicle to a stop line is equal to or longer than a predetermined value K [m], and 0 is set when the distance is shorter than the predetermined value K [m]. As described above, in the data for learning shown in FIG. 5, the pieces of the environment information of x1 to x6 and y1 are associated with the traveling data of the inter-vehicle distance D and the vehicle speed V.

Another example of the data for learning stored in the data-for-learning storage unit 21 is shown in FIG. 7. As shown in FIG. 7, pieces of data of a braking distance Db, a speed at the start of deceleration Vb, and x1 to x6 are recorded in the data for learning. The braking distance Db is a braking distance of the case where the vehicle is stopped at an intersection, and the speed at the start of deceleration Vb is a speed at the start of deceleration of the case where the vehicle is stopped at an intersection.

x1 to x6 in FIG. 7 are data that are set based on the environment information, and a value of 0 or 1 is set according to a setting method shown in FIG. 8. For example, in the case where the data of the braking distance Db and the speed at the start of deceleration Vb shown in FIG. 7 are obtained, for x1, 1 is set when a curvature of the road on which the vehicle is traveling is equal to or greater than a predetermined value, and 0 is set when the curvature is smaller than the predetermined value.

For x2, 1 is set when the vehicle is traveling downhill, and 0 is set in other cases (a flat road or uphill), and for x3, 1 is set when a traffic light ahead of the vehicle is a red light, and 0 is set in other cases (a green light or no traffic light). Note that, the red light may include a yellow light. For x4, 1 is set when it is night-time, and 0 is set when it is other than night-time. The determination of whether it is night-time may be performed based on a lighting state of the headlights. For x5, 1 is set when the weather around the vehicle is bad weather, and 0 is set when it is not bad weather. For a method of determining whether it is bad weather, it is determined that it is not bad weather when the wipers of the vehicle are OFF or set to be intermittent, and it is determined that it is bad weather when the wipers are ON. For x6, 1 is set when the direction indicator used for turning the vehicle right or left is ON, and 0 is set when the direction indicator is OFF. As described above, in the data for learning shown in FIG. 7, the pieces of the environment information of x1 to x6 are associated with the traveling data of the braking distance Db and the speed at the start of deceleration Vb.

In step S107, the data-for-learning storage unit 21 determines whether a predetermined amount of the data for learning could be stored, and when the stored data for learning is less than the predetermined amount, the process returns to step S103, and when the predetermined amount or more of the data for learning could be accumulated, the process proceeds to step S109.

In step S109, the driving characteristic learning unit 23 learns the driving characteristics of the driver during the manual driving. For example, in the learning of an inter-vehicle distance, the learning is performed by creating a multiple regression model expressed by the following Expression (1) using the data set shown in FIG. 5.

[Math. 1]

$$Df=(a0+a1x1+a2x2+a3x3+a4x4+a5x5+a6x6)Vf+(b0+b1y1) \qquad (1)$$

In Expression (1), Vf is a current vehicle speed, and Df is an inter-vehicle distance to a preceding vehicle calculated from the model. x1 to x6 and y1 are environmental factors, and a0 to a6, b0, and b1 are coefficients obtained by the learning. The term of (a0 to a6x6) in Expression (1) is the time between the host vehicle and a traveling preceding vehicle (time-headway without a distance between stopped vehicles). The term of (b0+b1y1) is a distance between stopped vehicles, which is an inter-vehicle distance between the vehicle and the preceding vehicle when vehicle speeds of them become zero. As described above, the multiple regression model expressed by Expression (1) indicates that an inter-vehicle distance to a preceding vehicle and a distance between stopped vehicles are varied depending on the environmental factors.

Among the coefficients in Expression (1), as shown in FIG. 6, a0 is a reference value that is set for each trip and is an average value of the time-headway in a trip when the values of x1 to x6 are 0. b0 is a reference value that is set for each driver and is a distance between stopped vehicles of the case where the value of y1 is 0. For example, an average value of a distance between stopped vehicles may be used.

In this way, the driving characteristic learning unit 23 performs the multiple regression analysis using the data for learning as shown in FIG. 5 to calculate the coefficients of a0 to a6, b0, and b1 in Expression (1).

In the learning of a braking distance, the learning is performed by creating a multiple regression model expressed by the following Expression (2) using the data set shown in FIG. 7.

[Math. 2]

$$Db=(c0+c1x1+c2x2+c3x3+c4x4+c5x5+c6x6)Vb^2+dVb \qquad (2)$$

In Expression (2), Vb is a speed at the start of deceleration, and Db is a braking distance calculated from the model. x1 to x6 are environmental factors, and c0 to c6 and d are coefficients obtained by the learning. As described above, the multiple regression model expressed by Expression (2) indicates that a braking distance of the vehicle about to stop at an intersection is varied depending on the environmental factors.

The multiple regression model of Expression (2) may be applied to a different type of the deceleration starting behavior. As shown below, Expression (2) may be expressed as Expression (3), and Expression (4) can be derived from Expression (2) and Expression (3).

[Math. 3]

$$Db = Vb^2/2a + dVb \quad (3)$$

[Math. 4]

$$a = \frac{1}{2}(c0 + c1x1 + c2x2 + c3x3 + c4x4 + c5x5 + c6x6) \quad (4)$$

a represents an average deceleration (m/s$^2$) in Expressions (3) and (4), and d represents TTI (time to intersection: the time to reach an intersection under the assumption that the vehicle keeps moving at the speed at the start of braking) in Expressions (2) and (3).

Among the coefficients in Expression (2), as shown in FIG. 8, c0 and d are reference values that are set for each person. c0 is an average value of a deceleration when the values of x1 to x6 are 0, and d is a degree of dependency on TTI (that is, a degree of variation of the deceleration depending on the speed). A value closer to 1 is set to d as the degree of dependency on TTI is higher.

In this way, the driving characteristic learning unit 23 performs the multiple regression analysis using the data for learning as shown in FIG. 7 to calculate the coefficients of c0 to c6 and d in Expression (2). The driving characteristic learning unit 23 calculates standard deviations and averages of parameters to obtain probability distribution.

In step S111, the driving characteristic learning unit 23 stores the calculated coefficients of a0 to a6, b0, and b1 of Expression (1) or the calculated coefficients of c0 to c6 and d of Expression (2) and probability distributions of the parameters as a calculation result, and terminates the driving characteristic learning processing according to this embodiment.

[Procedure of Automated Driving Control Processing]

Next, a procedure of the automated driving control processing by the driving assistance device 1 according to this embodiment is described with reference to the flowchart in FIG. 9.

As shown in FIG. 9, in step S201, the area determination unit 25 obtains the current location of the vehicle from the data-for-learning storage unit 21 and determines the area in which the vehicle is currently traveling based on the current location of the vehicle. The area to be determined may either be an area divided by administrative unit or an area having similar driving characteristics.

In step S203, the driving characteristic adjustment unit 27 detects the driving characteristics of the area determined in step S201 and compares the detected driving characteristics of the area and the learning result of the driving characteristic learning processing to determine whether the predetermined gap occurs therebetween. When the predetermined gap occurs, the process proceeds to step S205, and when the gap does not occur, the process proceeds to step S213.

First, the case where the predetermined gap occurs is described. In step S205, the driving characteristic adjustment unit 27 detects the traveling data on the traveling state of the vehicle and the environment information on the traveling environment around the vehicle from the traveling state detection unit 3 and the traveling environment detection unit 5.

In step S207, the driving characteristic adjustment unit 27 adjusts the learning result of the driving characteristic learning processing according to the driving characteristics of the area. For example, as shown in FIG. 10, an acceptable range A is set in advance for a detected driving characteristic X of the area. In FIG. 10, a range from −1.5σ to +1.5σ is set as the acceptable range. Then, when learning results Y1 and Y2 are outside of the acceptable range A, and it is determined that the predetermined gap occurs, the driving characteristic adjustment unit 27 adjusts the learning results Y1 and Y2 to make them closer to the driving characteristic X of the area. Specifically, the adjustment is performed such that a vertex y1 indicating the average value of the learning result Y1 is within the acceptable range A. At the same time, also for the learning result Y2, the adjustment is performed such that a vertex y2 indicating the average value of the learning result Y2 is within the acceptable range A. In this process, the adjustment may be made such that the vertexes y1 and y2 of the learning results Y1 and Y2 coincide with a vertex x indicating the average value of the driving characteristic X of the area. In this case, the learning results Y1 and Y2 coincide with the driving characteristic X of the area, and the automated driving control is executed with the driving characteristic X of the area.

FIG. 10 shows an example of the case where the parameter is a speed, and the learning result Y1 shows that the driver tends to drive in hurry too much with the speed too much faster than the driving characteristic X of the area. If the automated driving control is executed with the learning result Y1 without adjusting the learning result Y1, surrounding vehicles traveling in this area may feel that they are being tailgated and feel uncomfortable and insecure. However, in this embodiment, the learning result Y1 is adjusted to be closer to the driving characteristic X of the area; thus, it is possible to prevent the surrounding vehicles from feeling uncomfortable and insecure by executing the automated driving control based on the adjusted learning result.

On the other hand, the learning result Y2 shows that the driver tends to drive slowly too much with the speed too much slower than the driving characteristic X of the area. If the automated driving control is executed with the learning result Y2 without adjusting the learning result Y2, it may obstruct the traffic flow and cause trouble to the surrounding vehicles. Additionally, the occupant may feel uncomfortable and insecure by the horns blasted by the surrounding vehicles. However, in this embodiment, the learning result Y2 is adjusted to be closer to the driving characteristic X of the area; thus, it is possible to prevent the trouble to the surrounding vehicles and uncomfortable and insecure feelings of the occupant by executing the automated driving control based on the adjusted learning result.

The acceptable range A may always use the constant values; however, the acceptable range A may also be set based on driving behavior characteristics of drivers in the area. For example, the acceptable range is set based on the degree of variation of the driving behaviors of the drivers in the area. When the variation of the driving behaviors of the drivers in the area is small, the acceptable range may be narrowed to a range between −1σ and +1σ, and when the variation is large, the acceptable range may be widened to a range between −2σ and +2σ. For example, in the case where the parameter is a speed, the acceptable range A is widened if there are a variety of drivers such as fast drivers and slow drivers, and the acceptable range A is narrowed if almost all drivers are traveling at a similar speed.

The acceptable range A may be changeable depending on the surrounding situation. For example, when the automated driving vehicle is traveling on a highway, surrounding vehicles are traveling at a speed around 100 km/h, and the variation is small; thus, the acceptable range A may be narrowed. On the other hand, for the case of traveling on an ordinary road, the variation of speeds of surrounding vehicles is large; thus, it is preferred to widen the acceptable range A.

As described above, the driving characteristic adjustment unit 27 adjusts the learning result of the driving characteristic learning processing according to the driving characteristics of the area. The learning results Y1 and Y2 shown in FIG. 10 respectively represent the learning results calculated for the coefficients a0 to a6, b0, and b1 in Expression (1) and the coefficients c0 to c6 and d in Expression (2) calculated by the driving characteristic learning processing. Thus, these coefficients are respectively adjusted to be closer to the driving characteristics of the area.

However, when there are no surrounding vehicles, the adjustment according to the driving characteristics of the area is not needed; thus, the learning result of the driving characteristic learning processing may be directly applied to the driving characteristics under the automated driving control without using the adjusted learning result.

In step S209, the automated driving control execution unit 29 executes the automated driving control based on the thus-adjusted learning result. Specifically, the automated driving control execution unit 29 transmits the control execution instruction to the actuator 11 and executes operations of the accelerator, the brake, the steering, and the like required for the automated driving.

In step S211, the automated driving control execution unit 29 determines whether the automated driving is terminated, and when the automated driving is not terminated, the process returns to step S205 and the automated driving control is continued. On the other hand, when the automated driving is switched to the manual driving, and the automated driving is terminated, the automated driving control processing according to this embodiment is terminated.

Next, the case where the predetermined gap does not occur in step S203 is described. In step S213, the automated driving control execution unit 29 detects the traveling data on the traveling state of the vehicle and the environment information on the traveling environment around the vehicle from the traveling state detection unit 3 and the traveling environment detection unit 5.

In step S215, the automated driving control execution unit 29 sets the driving characteristics based on the learning result of the driving characteristic learning processing. Specifically, the coefficients a0 to a6, b0, and b1 of Expression (1) and the coefficients c0 to c6 and d of Expression (2) as the learning result are set to Expressions (1) to (4), and the driving characteristics such as the inter-vehicle distance Df and the braking distance Db are calculated. The automated driving control execution unit 29 then sets the calculated driving characteristics as the driving characteristics under the automated driving control.

In step S217, the automated driving control execution unit 29 executes the automated driving control using the thus-set driving characteristics. Specifically, the automated driving control execution unit 29 transmits the control execution instruction to the actuator 11 and executes the operations of the accelerator, the brake, the steering, and the like required for the automated driving.

In step S219, the automated driving control execution unit 29 determines whether the automated driving is terminated, and when the automated driving is not terminated, the process returns to step S213 and the automated driving control is continued. On the other hand, when the automated driving is switched to the manual driving, and the automated driving is terminated, the automated driving control processing according to this embodiment is terminated.

Effects of Embodiment

As described in detail, the driving assistance method according to this embodiment includes detecting a driving characteristic of an area in which the automated driving vehicle is traveling, and adjusting a learning result according to the detected driving characteristic of the area and executing the control of the automated driving based on the adjusted learning result. Consequently, the automated driving vehicle do not behave differently from surrounding vehicles even when the learning result differs from the driving characteristic of the area, and this can prevent the insecure feeling of the occupant. Additionally, since the different behavior of the automated driving vehicle from the surrounding vehicles can be suppressed, it is possible to prevent the provision of the insecure feeling to the surrounding vehicles.

In the driving assistance method according to this embodiment, when a predetermined gap occurs between the driving characteristic of the area and the learning result, the learning result is adjusted to be closer to the driving characteristic of the area. Consequently, even when there is a gap between the learning result and the driving characteristic of the area, it is possible to make the learning result closer to the driving characteristic of the area. This enables traveling in accordance with the unique way of traveling in the area even in the scene where the occupant of the vehicle is likely to feel insecure for the way of traveling in the traveling area, and thus it is possible to suppress the insecure feeling of the occupant and the provision of the insecure feeling to the surrounding vehicles at proper timing.

Additionally, in the driving assistance method according to this embodiment, an acceptable range is set for the driving characteristic of the area, the acceptable range being set based on a driving behavior characteristic of drivers in the area. Consequently, the learning result can be adjusted according to the driving behavior characteristic of the drivers in the area, and thus it is possible to adjust the learning result properly.

In the driving assistance method according to this embodiment, the acceptable range is changeable depending on a surrounding situation of the automated driving vehicle. Consequently, the learning result can be adjusted according to the surrounding situation flexibly, and thus it is possible to adjust the learning result properly.

Additionally, in the driving assistance method according to this embodiment, the driving characteristic to be learned is at least one of an inter-vehicle distance, a timing of braking, a speed, an acceleration, and a gap time. Consequently, it is possible to adjust the learning result specifically according to each parameter.

In the driving assistance method according to this embodiment, the area is divided by administrative unit.

Consequently, since the areas are divided clearly, the occupant when moving into another area can recognize the change of the area surely.

Additionally, in the driving assistance method according to this embodiment, the area is divided by region having a similar driving characteristic. Consequently, since the driving characteristics are similar in the area, it is possible to execute the automated driving control appropriate for the way of traveling in the area more reliably by adjusting the learning result of each area.

In the driving assistance method according to this embodiment, the driving characteristic of the area is stored in the automated driving vehicle in advance. Consequently, it is possible to adjust the driving characteristic quickly at the time point when the traveling area is changed or the time point when the predetermined gap occurs.

Additionally, in the driving assistance method according to this embodiment, the driving characteristic of the area is calculated by an external server. Consequently, it is possible to reduce the processing load in the automated driving vehicle and also possible to reduce the cost by performing the processing by the external server at once.

In the driving assistance method according to this embodiment, the automated driving vehicle obtains the driving characteristic of the area from the external server through a communication unit. Consequently, it is possible to reduce the processing load in the automated driving vehicle and also possible to reduce the capacity for storing the driving characteristics of the area.

The above-described embodiment is an example of the present invention. Therefore, the present invention is not limited to the above-described embodiment, and it is needless to say that, even for a mode other than the above embodiment, various changes depending on designs and the like can be made without departing from the technical idea according to the present invention.

REFERENCE SIGNS LIST 1 driving assistance device
2 traveling state detection unit
5 traveling environment detection unit
7 driving switching switch
9 control state indication unit
11 actuator
13 management server
21 data-for-learning storage unit
23 driving characteristic learning unit
25 area determination unit
27 driving characteristic adjustment unit
29 automated driving control execution unit
31 data collection unit
33 area driving characteristic calculation unit
35 database
100 driving assistance system

The invention claimed is:

1. A driving assistance method for an automated driving vehicle that is capable of switching between manual driving by a driver and automated driving, learns a first driving characteristic of the driver during the manual driving, and reflects a learning result of the first driving characteristic to a second driving characteristic under control of the automated driving, comprising:

detecting a third driving characteristic of an area in which the automated driving vehicle is traveling, wherein the third driving characteristic of the area relates to how other vehicles operate in the area;

adjusting the learning result of the first driving characteristic of the driver according to the detected third driving characteristic of the area to obtain the second driving characteristic; and executing the control of the automated driving of the automated driving vehicle based on the second driving characteristic that is the adjusted learning result.

2. The driving assistance method according to claim 1, wherein when a predetermined gap occurs between the third driving characteristic of the area and the learning result, the learning result is adjusted to be closer to the third driving characteristic of the area.

3. The driving assistance method according to claim 1, wherein an acceptable range is set for the third driving characteristic of the area, the acceptable range being set based on fourth driving behavior characteristic of drivers in the area.

4. The driving assistance method according to claim 3, wherein the acceptable range is changeable depending on a surrounding situation of the automated driving vehicle.

5. The driving assistance method according to claim 1, wherein the first driving characteristic to be learned is at least one of an inter-vehicle distance, a timing of braking, a speed, an acceleration, and a gap time.

6. The driving assistance method according to claim 1, wherein the area is divided by administrative unit.

7. The driving assistance method according to claim 1, wherein the area is divided by region having a similar driving characteristic.

8. The driving assistance method according to claim 1, wherein the third driving characteristic of the area is stored in the automated driving vehicle in advance.

9. The driving assistance method according to claim 1, wherein the third driving characteristic of the area is calculated by an external server.

10. The driving assistance method according to claim 9, wherein the automated driving vehicle obtains the third driving characteristic of the area from the external server through a communication unit.

11. A driving assistance device for an automated driving vehicle that is capable of switching between manual driving by a driver and control of automated driving, learns a first driving characteristic of the driver during the manual driving, and reflects a learning result to a second driving characteristic under the control of the automated driving, wherein the driving assistance device comprises a controller configured to:

detect a third driving characteristic of an area in which the automated driving vehicle is traveling, wherein the third driving characteristic of the area relates to how other vehicles operate in the area;

adjust the learning result of the first driving characteristic of the driver according to the detected third driving characteristic of the area to obtain the second driving characteristic; and execute the control of the automated driving of the automated driving vehicle based on the second driving characteristic that is the adjusted learning result.

* * * * *